Jan. 21, 1969 J. H. WORTHEN 3,422,540
BORE GAGE
Filed Feb. 17, 1967 Sheet 1 of 2

INVENTOR.
JOHN H. WORTHEN
BY Barlow & Barlow
ATTORNEYS

Jan. 21, 1969   J. H. WORTHEN   3,422,540
BORE GAGE

Filed Feb. 17, 1967   Sheet 2 of 2

INVENTOR.
JOHN H. WORTHEN
BY
*Barlow & Barlow*
ATTORNEYS

United States Patent Office 3,422,540
Patented Jan. 21, 1969

3,422,540
BORE GAGE
John H. Worthen, Providence, R.I., assignor to Federal Products Corporation, a corporation of Rhode Island
Filed Feb. 17, 1967, Ser. No. 616,923
U.S. Cl. 33—143      3 Claims
Int. Cl. G01b 5/00

ABSTRACT OF THE DISCLOSURE

A more gage having an indicator and a work contacting head with a frictionless mounting for a movable contact therein and a frictionless connection to a motion transmitting means for transmitting motion from the work contacting head to an indicator actuating member.

Background of the invention

The measuring system of a bore gage usually has bearings that create wear problems and dirt problems by reason of sliding parts which provide a constant maintenance problem particularly when the gage is used in machining operations with coolants present and often require disassembly of the parts of the gage in order to clean the same.

Summary of the invention

The measuring contact is secured to a coupling linkage which is mounted on a leaf spring type reed in the gage head which reed flexes without friction to adjust to the work size. This coupling linkage is permanently connected to a transfer rod through a second leaf spring type reed which also may flex and transmit thrust to the rod to effect indication on the indicator.

Description of the preferred embodiment of the invention

Figure 1:
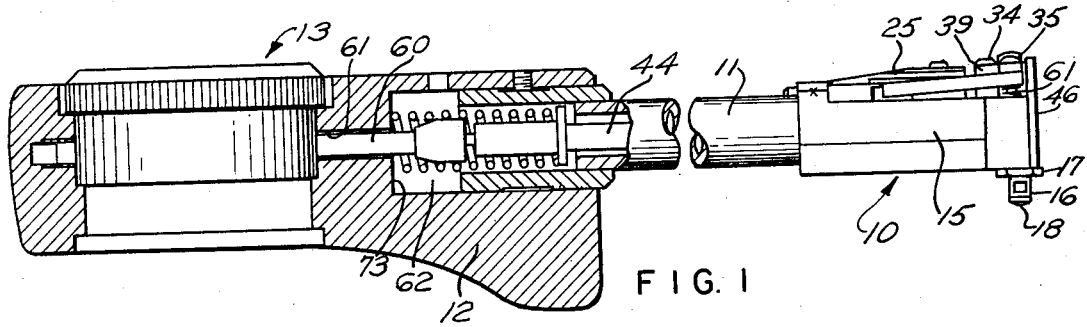
FIG. 1 is a side elevation partly in section and broken away for shortening the same.
Figure 2:
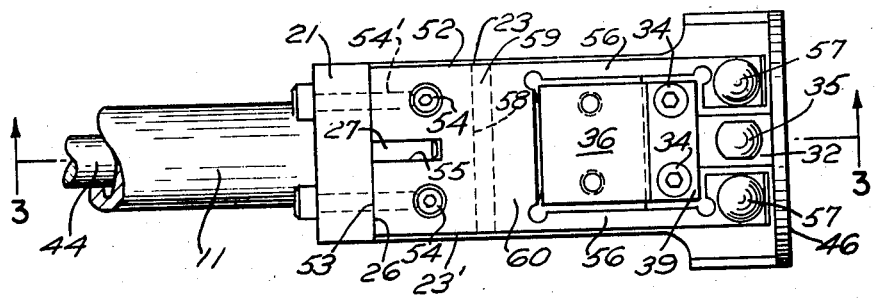
FIG. 2 is a top plan view of the gage head on a larger scale than in FIG. 1 and with the cover plate removed.
Figure 3:
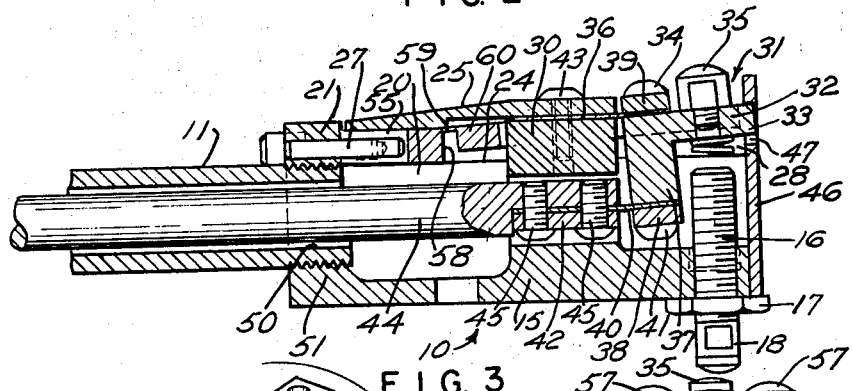
FIG. 3 is a sectional view on line 3—3 of FIG. 2 with the cover plate in position.

In FIG. 1, 10 designates the gage head which has a handle 11 extending therefrom to a body 12 containing an indicator 13 which is set into this body. Means are provided within the handle for transmitting motion from the gaging head 10 to the indicator 13 as will be more fully described.

The gage head 10 comprises a body 15 of rigid block-like construction which has been hollowed out to receive operating parts therein. An adjustable but frictionally fixed measuring contact 16 is threaded into the body and held in adjusted fixed position by a check nut 17 providing a contact point at 18 generaly centrally lengthwise of the body as may be seen in FIG. 4 and which may extend laterally from the body a certain distance commensurate with maintaining a sufficient included angle as defined by the centralizing contacts 57 and the contact point 18.

The body block 15 of the head 10 is cut away to provide a rear hollow chamber 20 and a forward hollow chamber 28 divided by a solid post portion 30 integral with the side walls 23 and 23' which extend lengthwise of the body and on either side of the solid post 30. These walls have upper surfaces 24 in a single plane extending substantially the length of the body. A bracket 21, integral with the block 15, rises from the plane of the surfaces 24 and has an accurately machined front surface 26 formed at right angles to the surface 24. A locating pin 27 extends from this surface 26 and may be positioned central thereof laterally of the head.

Figures 4, 5:
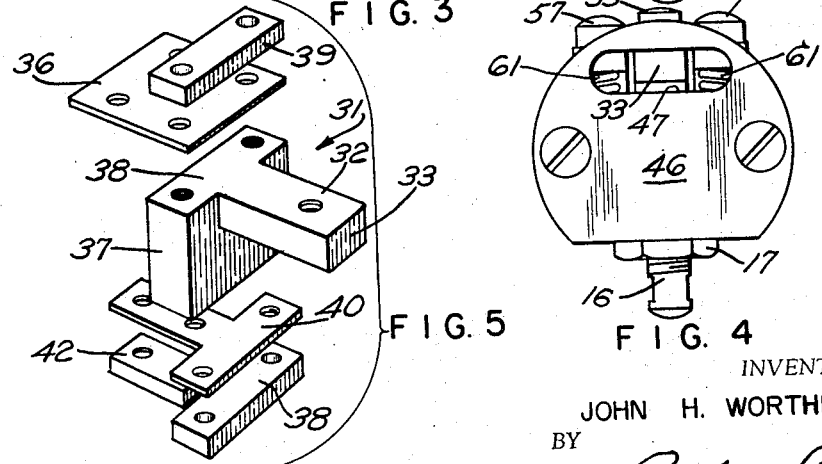
FIG. 4 is an end view of the head.
FIG. 5 is an exploded perspective view of the movable coupling linkage of the measuring system with its mounting means.

A coupling linkage, designated generally 31, is generally of bell crank shape as seen in perspective in FIG. 5 and has a horizontally extending arm 32 which mounts a contact or work engaging removably mounted boss 35 and has a downwardly extending leg 37. This coupling linkage 31 is mounted in the body 15 by means of a leaf spring reed 36 which may be secured to the upper surface 38 by means of a block 39 and screws 34 extending through the block and into the linkage 31 binding the reed securely thereto. This reed 36 is secured to the rigid post 30 by means of a cover member 25 bound to the post by screws 43 alternately the reed may be welded by modern techniques to the linkage 31 and post 30.

The lower end of the leg 37 of the linkage has a reed or leaf-like spring 40 of generally T shape, the head of the T being bound to the lower surface of the movable contact leg 37 for example, by a block 38 having screws passing therethrough and into the leg 37. The portion of the spring extending from the T head of the reed 40 is secured by means of a block 42 and screws 45 to the motion transmitting rod 44 of the gage. This rod 44 extends through the handle 11 and serves to transmit motion to the dial indicator 13. The rod 44 extends lengthwise of the body through an opening 50 in the end 51 of the body and is held centrally of the opening 50 by the linkage leaf springs 36, 40. The bore 50 continues through the post 30 to substantially the chamber 28 of the body so as to provide freedom of movement of the rod 44 endwise in the body.

At the end of the body there is a plate 46 having an opening 47 therein into which the end 33 of the arm 32 of the movable contact member 31 extends. Thus the upper and lower edges of this opening 47 serve as a means to prevent excessive movement of the bell crank shaped linkage on its leaf spring reed mountings although movement of the linkage is permitted.

Centralizing is obtained by means of a plate 52, one end 53 being secured to the body surface 24 with screws 54 and to bracket 21 by screws 54', horizontal position being secured by means of the pin 27 closely fitting in the slot 55. The plate 52 has legs 56 which carry the work engaging contacts 57 protruding as bosses therefrom for contact with the surfaces of the bore into which the body is positioned. The contact surfaces of these bosses are generally spherical and are located on either side of and equally distant from a plane passing through the two measuring contacts 18 and 35. A slot 58 may be cut through the plate 52 to provide a thin flexible leaf-like spring portion 59 which enables the legs 56, rigidly connected by a base portion 60, to flex about this hinge portion 59.

The cover 25, one end of which serves to provide a jaw for binding the reed 36 to the rigid post 30, extends over the plate 52 and over the spring reed hinge portion 59 extending to the bracket 21 to serve as a protection to the spring hinge and to prevent excessive flexure of the plate 52. The plate 52 has its legs 56 straddling the rigid post 30 and spaced therefrom sufficiently so that these legs have freedom of movement. Springs 61 located beneath each of the legs urges the legs upwardly flexing the reed 59.

Figure 6:
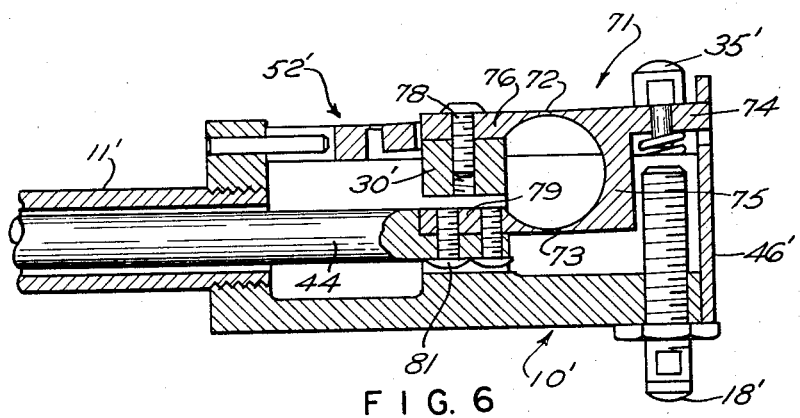
FIG. 6 is a sectional view similar to FIG. 3 showing a modified form.
Figure 7:
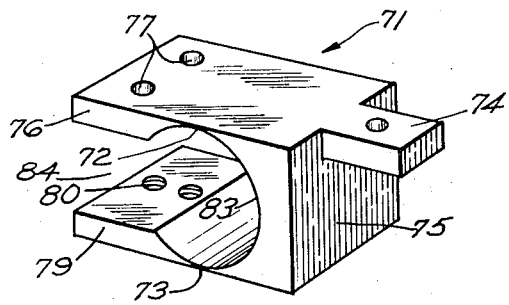
FIG. 7 is a perspective view of the modified coupling linkage.

In FIGURES 6 and 7, in which like parts to the previous form bear the same numerals with a prime, there is shown an alternate form of coupling linkage generally designated 71 in which the leaf springs 72, 73 are integral with the bell crank portion 74, 75. Leaf spring 74 is joined to mounting block portion 76 which is provided with screw holes 77 and may thus be fastened to post 30' by screws 78. Likewise leaf spring 73 is joined to mounting portion 79 which has threaded holes 80 to receive fasteners 81 that will secure the rod 44' thereto. While there may be other methods of construction, the form disclosed is machined from a solid block, the block being drilled to form a bore 83 with a radial slot 84 being milled to intersect the bore 83. At a suitable time in the machining operation, the area forming the leaf springs 72, 73 is thinned and when the linkage 71 is completely formed is then heat treated to the proper temper. In this form certain advantages will accrue in the assembly operation as mechanical fastenings are reduced in number.

It will be appreciated from the foregoing that there is provided a novel form of coupling linkage for a bore gage which is frictionless and which also supports the motion transmitting rod in frictionless manner.

I claim:
1. In a gage, a body having a measuring contact thereon, a transfer rod extending into said body a coupling linkage comprising a bell crank having two arms, a measuring contact on one of said arms for cooperation with said contact, a flexible leaf spring reed coupling said body and one of said arms of said bell crank adjacent the juncture of said arms to movably mount said linkage in said body, said reed coupling extending generally parallel to the transfer rod, and a flexible reed extending generally parallel to said first reed coupling and coupling the other of said arms and said rod to move said rod axially upon movement of said contact member.

2. In a gage as in claim 1 wherein means are provided to limit the movement of said coupling linkage.

3. In a gage as in claim 4 wherein said means comprise an extension on said linkage and a plate on said body, said plate having an opening in which said extension is located with the upper and lower edges thereof engageable by said extension.

References Cited
UNITED STATES PATENTS 2,139,251  12/1938  Aller.
2,253,803  8/1941  Newberry.

HARRY N. HAROIAN, *Primary Examiner.*

U.S. Cl. X.R.
33—148, 178